United States Patent
Wang et al.

(10) Patent No.: US 7,381,683 B1
(45) Date of Patent: *Jun. 3, 2008

(54) METHOD OF PRODUCING MULTI-COMPONENT CATALYSTS

(75) Inventors: Jian Wang, San Mateo, CA (US); Xianghong Hao, Sunnyvale, CA (US); Jifei Jia, Mountain View, CA (US); Jonathan W. Woo, San Jose, CA (US)

(73) Assignee: NanoStellar, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/261,132

(22) Filed: Oct. 28, 2005

Related U.S. Application Data

(63) Continuation of application No. 10/987,456, filed on Nov. 12, 2004, now abandoned, which is a continuation-in-part of application No. 10/975,646, filed on Oct. 28, 2004, now abandoned.

(51) Int. Cl.
*B01J 23/00* (2006.01)
*B01J 21/00* (2006.01)
*B01J 20/00* (2006.01)

(52) U.S. Cl. ............ 502/327; 502/326; 502/330; 502/331; 502/332; 502/333; 502/334; 502/339; 502/344; 502/345; 502/346; 502/347; 502/348; 502/355; 502/415; 502/439

(58) Field of Classification Search ........ 502/326, 502/327, 330–334, 339, 344–348, 355, 415, 502/439
See application file for complete search history.

(56) References Cited

U.S. PATENT DOCUMENTS

| 2,760,912 A | * | 8/1956 | Schwarzenbek | ......... 208/138 |
| 2,897,137 A | * | 7/1959 | Schwarzenbek | ......... 208/140 |
| 2,898,289 A | * | 8/1959 | Kimberlin, Jr. et al. | .... 208/138 |
| 2,950,243 A | * | 8/1960 | Brennan et al. | ......... 208/138 |
| 3,169,993 A | * | 2/1965 | Pickens et al. | ......... 564/465 |
| 3,380,934 A | * | 4/1968 | Batzold | ......... 502/339 |
| 3,431,220 A | * | 3/1969 | Batzold | ......... 502/325 |
| 3,536,632 A | | 10/1970 | Kroll | |
| 3,849,343 A | * | 11/1974 | Hoekstra | ......... 502/328 |
| 4,038,175 A | * | 7/1977 | Bhasin | ......... 208/144 |
| 4,073,750 A | * | 2/1978 | Yates et al. | ......... 502/259 |

(Continued)

FOREIGN PATENT DOCUMENTS

GB 1282138 7/1972

OTHER PUBLICATIONS

Hanna Härelind Ingelsten et al., "Deposition of Platinum Nanoparticles, Synthesized in Water-in-oil Microemulsions, on Alumina Supports," *Langmuir*, 2002, vol. 18(5): pp. 1811-1818.

(Continued)

*Primary Examiner*—Cam N. Nguyen
(74) *Attorney, Agent, or Firm*—Patterson & Sheridan, LLP

(57) ABSTRACT

Supported catalysts are produced with nanometer sized particles comprised of different metals dispersed throughout the catalyst support material. The supported catalysts reduce substantially or completely the amount of platinum that is required without sacrificing catalytic performance. In place of platinum, the supported catalysts employ palladium, silver, or copper, all of which costs significantly less than platinum.

19 Claims, 3 Drawing Sheets

U.S. PATENT DOCUMENTS

| | | | |
|---|---|---|---|
| 4,086,275 | A | 4/1978 | Matsuda et al. |
| 4,396,539 | A * | 8/1983 | Sapienza et al. ............ 502/326 |
| 4,835,131 | A | 5/1989 | DeJong |
| 4,839,327 | A | 6/1989 | Haruta et al. |
| 5,213,895 | A | 5/1993 | Hirai et al. |
| 5,275,998 | A | 1/1994 | Tsurumi et al. |
| 5,275,999 | A | 1/1994 | Tsurumi et al. |
| 5,292,931 | A | 3/1994 | Wirtz et al. |
| 5,371,277 | A | 12/1994 | Matsumoto et al. |
| 5,422,329 | A | 6/1995 | Wirtz et al. |
| 5,507,956 | A | 4/1996 | Bonse et al. |
| 5,518,979 | A | 5/1996 | Bonse et al. |
| 6,168,775 | B1 | 1/2001 | Zhou et al. |
| 6,347,284 | B1 | 2/2002 | Ohira et al. |
| 6,569,358 | B1 | 5/2003 | Tai et al. |
| 6,603,038 | B1 | 8/2003 | Hagemeyer et al. |
| 6,627,571 | B1 | 9/2003 | Lugmair et al. |
| 6,686,308 | B2 | 2/2004 | Mao et al. |
| 6,716,525 | B1 | 4/2004 | Yadav et al. |
| 6,746,597 | B2 | 6/2004 | Zhou et al. |
| 6,783,569 | B2 | 8/2004 | Cheon et al. |
| 6,987,200 | B2 | 1/2006 | Hagemeyer et al. |
| 2003/0134744 | A1 * | 7/2003 | Blankenship et al. ....... 502/339 |

OTHER PUBLICATIONS

Alexis T. Bell, "The Impact of Nanoscience on Heterogeneous Catalysts," *Science Magazine*, Mar. 2003, vol. 299: pp. 1688-1691.

Jin-An Wang et al., "Inhibition of carbon monoxide on methanol oxidation over γ -alumina supported Ag, Pd and Ag—Pd catalysts," *Applied Surface Science*, 1999, vol. 147: pp. 44-51.

Ioan Balint et al., "Investigation of the morphology—catalytic reactivity relationship for Pt nanoparticles supported on alumina by using the reduction of NO with $CH_4$ as a model reaction," *Chemical Communications*, 2002, 1044-1045.

Akane Miyazaki et al., "Morphology control of platinum nanoparticles and their catalytic properties," *Journal of Nanoparticle Research*, 2003, vol. 5: pp. 69-80.

H. Bönnemann et al., "Nanoscale colloidal metals and alloys stabilized by solvents and surfactants Preparation and use as catalyst precursors," *Journal of Organometallic Chemistry*, 1996 , vol. 520: pp. 143-162.

Jung Whan Yoo et al., "Propene hydrogenation over truncated octahedral Pt nanoparticles supported on alumina," *Journal of Catalysis*, 2003, vol. 214: pp. 1-7.

Pierre Braunstein et al., "Strategies for the Anchoring of Metal Complexes, Clusters, and Colloids Inside Nanoporous Alumina Membranes," *Chem. Eur. J.*, 2000, vol. 6(24): pp. 4637-4646.

S.J. Tauster, "Strong Metal—Support Interactions," *Accounts of Chemical Research*, Nov. 1987. vol. 20(11): pp. 389-394.

Lesser Blum et al., "Surface Morphology and Chemically Active Sites on Ru Based Ultracapacitors: Montecarlo Simulation with Embedded Atom Potentials," *MSM 99: Technical Proceedings of the 1999 International Conference on Modeling and Simulation of Microsystems*, 1999, Chapter 3: pp. 75-78.

C.G. Granqvist et al., "Ultrafine metal particles," *Journal of Applied Physics*, May 1976, vol. 47(5): pp. 2200-2219.

* cited by examiner

METHOD OF PRODUCING MULTI-COMPONENT CATALYSTS

RELATED APPLICATIONS

This application is a continuation of application Ser. No. 10/987,456 filed Nov. 12, 2004 now abandoned which is a continuation-in-part of application Ser. No. 10/975,646, filed Oct. 28, 2004 now abandoned.

BACKGROUND OF THE INVENTION

1. Field of the Invention

The present invention relates to the production of supported catalysts, more specifically to the method for making supported catalysts containing nanometer sized particles comprised of different metals dispersed throughout the catalyst support material.

2. Description of the Related Art

Many industrial products such as fuels, lubricants, polymers, fibers, drugs, and other chemicals would not be manufacturable without the use of catalysts. Catalysts are also essential for the reduction of pollutants, particularly air pollutants created during the production of energy and by automobiles. The majority of industrial catalysts are composed of a high surface area support material upon which chemically active metal nanoparticles (i.e., nanometer sized metal particles) are dispersed. The support materials are generally inert, ceramic type materials having surface areas on the order of hundreds of square meters/gram. This high specific surface area usually requires a complex internal pore system. The metal nanoparticles are deposited on the support and dispersed throughout this internal pore system, and are generally between 1 and 100 nanometers in size.

Processes for making supported catalysts go back many years. One such process for making platinum catalysts, for example, involves the contacting of a support material such as alumina with a metal salt solution such as chloroplatinate acid. The salt solution "impregnates" or fills the pores of the support during this process. Following the impregnation, the support containing the salt solution would be air dried, causing the metal salt to precipitate within the pores. The support containing the crystallized metal salt would then be exposed to a hydrogen or carbon monoxide gas environment, reducing the solid metal salt to metal particles. The currently used methods for producing supported catalysts, including impregnation methods, are further discussed below.

Yoo et al., in an article entitled "Propene Hydrogenation Over Truncated Octahedral Pt Nanoparticles Supported on Alumina," Journal of Catalysis, Vol. 214, pp. 1-7 (2003), disclose a process for loading colloidal platinum (Pt) nanoparticles (synthesized by a 1:5 concentration ratio of $K_2PtCl_4$ to polyacrylate capping polymer) into an alumina support via impregnation.

Miyazaki et al., in an article entitled "Morphology Control of Platinum Nanoparticles and Their Catalytic Properties," Journal of Nanoparticle Research, Vol. 5, pp. 69-80 (2003), disclose the preparation of Pt nanoparticles of varying morphology through the use of different capping polymers. Various shapes (such as square, triangular, and hexagonal) of Pt crystallites, as observed by transmission electron microscopy (TEM), were obtained. Supported catalysts were made by impregnation of previously formed Pt crystallites into an alumina support. Water was removed from the support by freeze drying, and the capping polymers were removed by calcinating in air at 500° C. for 8 hours.

U.S. Pat. No. 6,569,358 discloses a method of preparing a porous material incorporating ultrafine metal particles comprising the following steps: (1) preparing surface-protected ultrafine metal particles by reducing metal ions in the presence of molecules such as dodecanethiol molecules; (2) immersing a wet gel in a solution of the ultrafine metal particles, thus forming an ultrafine metal particle/wet gel composite in which the ultrafine metal particles are incorporated in the wet gel; and (3) drying the ultrafine metal particle/wet gel composite to form a porous body.

The process disclosed in U.S. Pat. No. 6,569,358 utilizes protecting agents or capping polymers. However, removal of protecting agents or capping polymers can be an issue for sensitive catalytic processes, as their destruction may leave contaminating residues that are undesirable. These residues may reduce activity of the catalyst by occupying active sites necessary for subsequent reactions. The residues may also leave behind trace quantities of poisons that will eventually kill the catalyst over time. Removal of organic capping agents and polymers usually require oxidation (or burning), but the heat required for such oxidation may produce unwanted sintering due to the high temperatures. Sintering will increase the metal particle size and reduce the active surface area of the catalyst. Furthermore, the use of capping agents can hinder the introduction of the metal crystallites into small pores of the support.

U.S. Pat. No. 6,686,308 discloses a supported catalyst comprising catalyst metal nanoparticles having an average particle size of typically 2.0 nm or less, which are supported on support materials at a loading of 30% or more. It teaches the use of platinum, palladium, ruthenium, rhodium, iridium, osmium, molybdenum, tungsten, iron, nickel or tin, as catalyst metals, and the use of carbon as the support material. The method of making a supported catalyst disclosed in U.S. Pat. No. 6,686,308 comprises the steps of: (1) providing a solution of metal chlorides of one or more catalyst metals in a solvent system containing at least one polyalcohol, typically ethylene glycol containing less than 2% water; (2) forming a colloidal suspension of unprotected catalyst metal nanoparticles by raising the pH of the solution, typically to a pH of 10 or higher, and heating the solution, typically to 125° C. or higher; (3) adding support particles to the colloidal suspension; and (4) depositing the unprotected catalyst metal nanoparticles on the support particles by lowering the pH of the solution, typically to a pH of 6.5 or lower.

U.S. Pat. No. 6,603,038 discloses a method for producing a catalyst containing one or several metals from the group of metals comprising the sub-groups Ib and VIIIb of the periodic table on porous support materials, characterized by a first step, in which one or several precursors from the group of metal compounds from sub-groups Ib and VIIIb of the periodic table is or are applied to a porous support, and a second step in which the nanoporous support to which at least one precursor has been applied, is treated with at least one reduction agent to obtain the metal nanoparticles produced in situ in the pores of the support. In the first step, catalysts were prepared by impregnation of the support with a metal salt solution, followed by a drying step. Subsequent to drying, as part of the second step, the impregnated support materials were reduced by various techniques including re-impregnation with liquid reducing agents.

SUMMARY OF THE INVENTION

The invention provides novel methods of producing supported catalysts containing nanometer sized particles comprised of different metals dispersed throughout the catalyst support material. The supported catalysts produced according to various embodiments of the invention have been shown to have similar or better catalytic performance as a supported catalyst of the prior art, while reducing substantially or completely the amount of platinum that is required. In place of platinum, the supported catalysts produced according to certain embodiments of the invention use palladium which costs about 75% less than platinum, or silver whose cost is marginal relative to the cost of platinum, or copper which costs even less than silver.

The method according to various embodiment of the invention includes the steps of immersing a support for the catalyst, such as alumina, in a solvent, mixing in metal salts of different types into the solvent, introducing a reducing agent into the solvent, separating the liquid from the solid in the solvent, and drying the separated solid by heating it.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
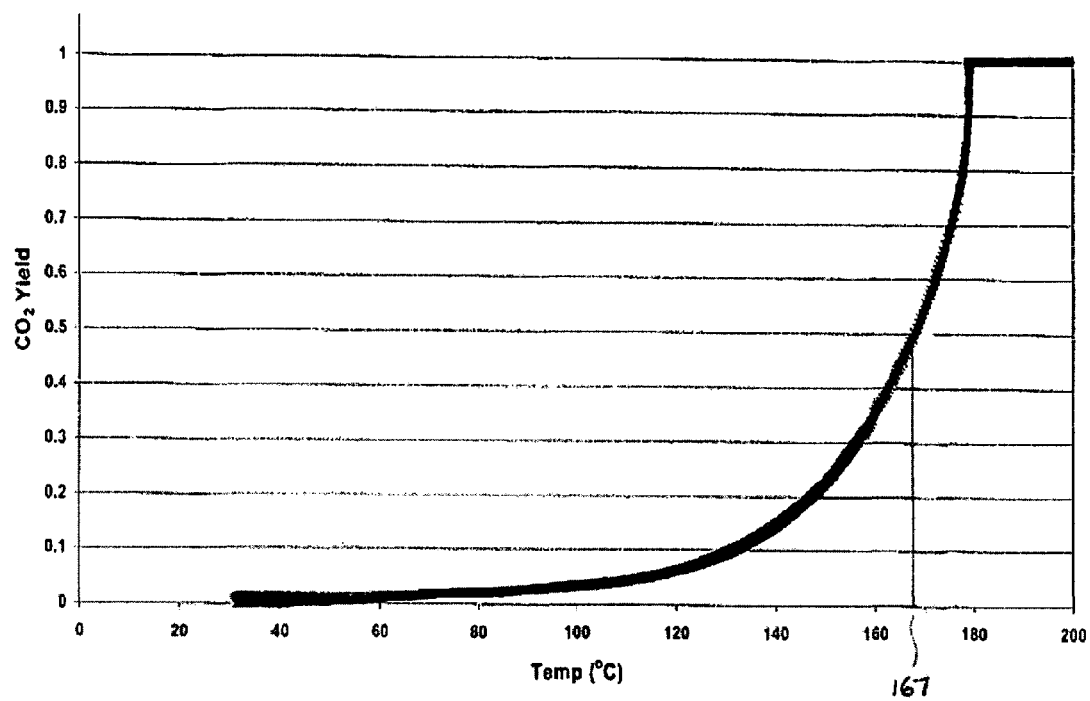
FIG. 1 is a light off curve for CO oxidation catalyst of the prior art.

A commonly used metric for catalytic performance is the temperature at which 50% yield will be observed. For simplicity, this temperature will be referred to herein as "T50." For catalysts designed for CO oxidation into $CO_2$, this temperature corresponds to the temperature at which 50% of CO will be oxidized into $CO_2$. Higher yields are observed at higher temperatures and lower yields are observed at lower temperatures. This relationship is shown in FIG. 1, which illustrates what is commonly known as a "light off" curve. A "light off" curve shows the desired yield versus the reaction temperature for a particular catalyst. In the particular example shown in FIG. 1, the $CO_2$ yield resulting from CO oxidation is shown versus the reaction temperature for a prior art Pt catalyst. FIG. 1 also shows that T50 for this Pt catalyst is 167° C.

Figure 2:
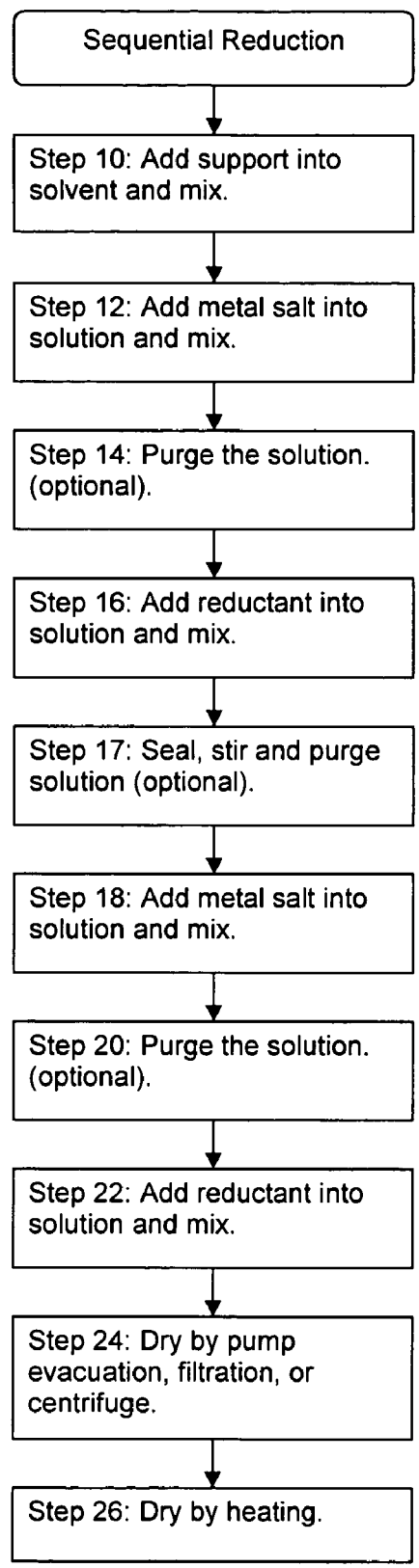
FIG. 2 is a process flow block diagram of a method for making catalysts according to a first embodiment of the present invention.

FIG. 2 shows a process flow block diagram of a method for making catalysts according to a first embodiment of the present invention, in which metal salts of different types are sequentially introduced and reduced in a solution containing the catalyst support material. In step 10, the support material for the catalyst is added to a solvent. The solvent may be any liquid within which a metal salt is suitably soluble, and which is sufficiently pure enough and can be removed from the support by evaporation, filtering, pump evacuation or using centrifuge. Such solvents include, but are not limited to, water, alcohol, and other organic solvents. Preferably, water is used. More preferably, double de-ionized (DDI) water is used. Alcohols that are suitable include, but are not limited to, methanol and ethanol and their mixtures, with and without water. Other organic solvents include tetrahydrofuran, acetic acid, ethylene glycol, N-methylpyrrolidone, dimethylformamide, dimethylacetalmide, and their mixtures, with and without water.

The support material for the catalyst may include, but are not limited to, alumina, silica, oxides of vanadium, oxides of titanium, oxides of zirconium, oxides of iron, cerium oxides, carbon, zeolites and molecular sieves. The solvent volume to support pore volume ratio is greater than 2, preferably between 10 and 100. The higher ratios provide for enhanced wetting of the pore volume of the support and ensure "fluid like" behavior of the mixture.

In step 10, the solvent and the support are mixed for a time period between 1 minute and 24 hours, preferably between 1 and 4 hours. Sufficient agitation to keep the support solids in suspension within the solution is desirable. If necessary, the temperature may be adjusted during this step. Typically, ambient temperature is used, within the range of 15 to 30° C.

Metal salt is added to the solvent-support solution in step 12. By adding the metal salt after the support is wetted with the solvent, uniform and complete wetting of the support with the solvent is ensured. This enables a more uniform distribution of the metal salt within the pores of the support, and more uniform reduction to metal crystallites in the subsequent steps. The use of higher solvent volume to support pore volume ratios further aids this process as it facilitates the transport of metal salts and reduces the metal into the support pore structures via diffusion.

In step 12, a soluble metal salt containing metal of a first type is added to the solution. A soluble salt containing one or more of the following metals: Pt, Pd, Ru, Rh, Re, Ir, Os, Fe, Co, Ni, Cu, Ag, Au, Zn, Cd, In, Ga, Sn, Pb, Bi, Sb, Ti, Zr, Cr, Mo, W, V, Nb and Mn, is suitable. Of the foregoing, soluble salts of Pt, Pd, Ru. Rh, Re, Cu, Au, Re, Ir, Os and Ag are preferable. Pt salts that are suitable include $Pt(NO_3)_2$, $(NH_3)_4Pt(NO_3)_2$, $H_2PtCl_6$, $K_2PtCl_4$, $(NH_3)_4Pt(OH)_2$, and $Cl_4Pt(NH_3)_2$. Ag and Cu salts that are suitable include $AgNO_3$, $AgCH_3COO$, $Cu(NO_3)_2$, $Cu(CH_3COO)_2$, and Cu(II)acetylacetonate. Pd salts include $Pd(NH_3)_4(NO_3)_2$ and $Pd(NO_3)_2$. The concentration of the metal salt is between $10^{-6}$ M and 1 M, preferably between $10^{-4}$ M and 0.1 M. The concentration of the metal salt will depend on the target weight loading of the final catalyst and the solvent volume to support pore volume used in step 10.

After the metal salt is added, the solution is mixed. Mixing time is between 1 and 4 hours, preferably between 1 and 2 hours. Sufficient agitation to keep the support solids in suspension is desirable. Agitation is also required to fully dissolve the metal salt within the solution and reduce any salt concentration gradients within the solution. The temperature is the same as in step 10. The pH and temperature of the solution may, however, be adjusted at this point, if desired. If the temperature or pH of the solution is adjusted, additional mixing is carried out. The additional mixing period is between 1 and 4 hours, preferably between 1 and 2 hours. The temperature is within a range of approximately 0° C. and 100° C., and the pH is in the range of approximately 3 to 11, preferably between 6 and 9. Nitric acid and ammonium hydroxide may be used to adjust the pH.

Step 14 is the purge step. It may be omitted depending on the application. In this step, the solution is purged with argon gas to de-gas the solution and remove any dissolved oxygen.

In step 16, a reducing agent is added to the solution. Suitable reducing agents include $H_2$, CO, $N_2H_4$, $NH_2OH$, alcohols, citrates such as sodium, potassium and ammonium citrate, alkali metal borohydrides such as sodium and potassium borohydride, and glycols. Preferably, $H_2$, $N_2H_4$, or $NH_2OH$ is used. When $H_2$ is used as the reducing agent, it is preferred that the optional purge step 14 be carried out. The quantity of reducing agent added is determined based on the amount of metal salt. An amount between 1 and 200 times the stoichiometric requirement needed to reduce the metal salt can be used, preferably between 1 and 10 times the stoichoimetric requirement.

After the reducing agent is added, the solution is mixed. While the solution is being mixed, the metal from the metal salt is reduced to nanometer sized particles on the support surfaces within the pores of the support. Sufficient agitation to keep the support solids in suspension is desirable. Agitation is also required to reduce salt concentration gradients within the solution. Mixing is carried out for a time period long enough to complete the reduction of the metal salt. For hydrogen reduction, this time period is typically between 0.1 to 48 hours, preferably 18-30 hours. For other reducing agents, the time period may be between 1 minute and 24 hours, preferably between 5 minutes and 8 hours. As the nanometer sized metal particles are nucleated and grow within the pores, the metal salt concentration in the pores drops, producing a concentration gradient which draws more metal salt into the pores from the bulk solution surrounding the support. The higher solvent volume to support pore volume ratios facilitate this liquid phase diffusion transport, reducing concentration gradients in the bulk fluid by allowing a thorough, convective mixing of this fluid, unhindered by the solid support particles.

An additional advantage of the higher solvent volume to support pore volume ratios is a reduction of the potential to nucleate and grow metal crystallites homogeneously in the bulk of the solvent, due to the lower concentration of the metal salt. This reduces any potential loss of expensive catalyst materials. Attempting to carry out the liquid phase, in-situ reduction process at low solvent volume to support pore volume ratios (near 1.0) could significantly increase the potential for homogeneous nucleation and growth of crystallites outside the support. The lower free solution volume combined with high solids content would significantly hinder diffusion transport into the support pore structure, tending to support and enhance any homogeneous nucleation process.

In step 17, the solution is sealed and stirred for a period of time at room temperature, and then purged with argon while it is stirred. This step may be omitted depending on the application. In steps 18, 20 and 22, the process steps 12, 14 and 16 are repeated using the mixture resulting after step 17, except in step 18, a metal salt containing a metal of a second type, which is different from the first type, is added to the solution. The molar ratio of the metal of the second type to the metal of the first type is preferably in the range of 1:0.001 to 0.001:1.

In step 24, the newly formed supported catalyst is separated from the liquid solution by any convenient method, such as evaporation, filtration, pump evacuation, or centrifuge. Then, in step 26, the newly formed supported catalyst is further dried at an elevated temperature between 100° C. and 150° C., preferably about 120° C.

Figure 3:
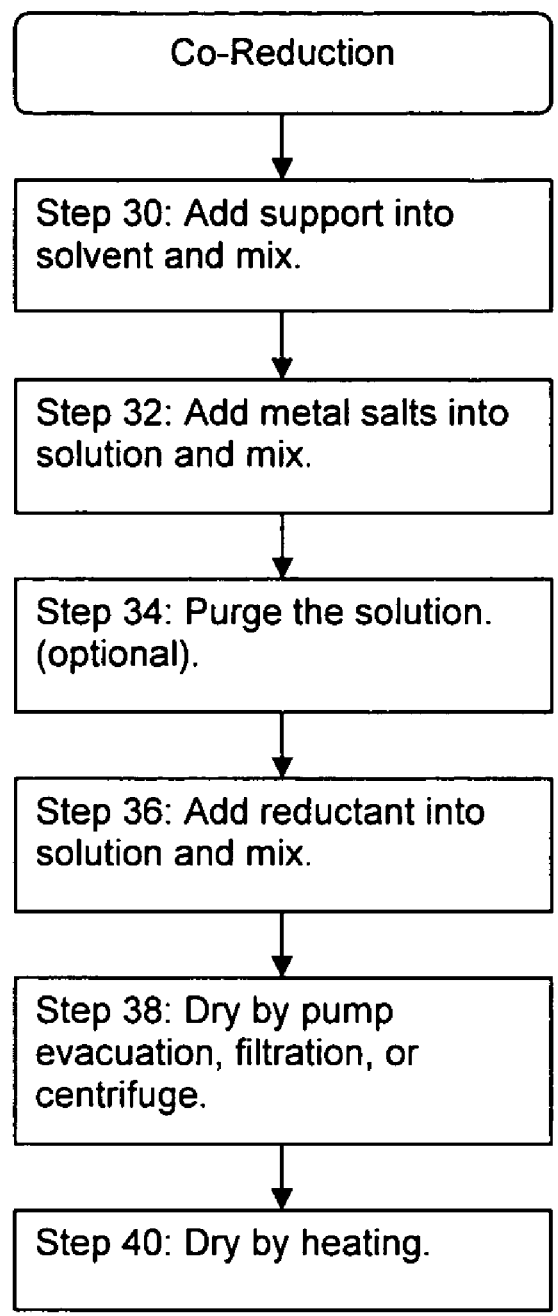
FIG. 3 is a process flow block diagram of a method for making catalysts according to a second embodiment of the present invention.

FIG. 3 shows a process flow block diagram of a method for making catalysts according to a second embodiment of the present invention. In this embodiment, the metal salts of different types are introduced in the same step (step 32) and reduced in the same step (step 36) rather than in two different steps.

These steps and the other steps, steps 30, 34, 38 and 40, which correspond respectively to steps 10, 14, 24 and 26 of the first embodiment, are otherwise carried out in the same manner as in the first embodiment.

The following examples serve to explain and illustrate the first, second, and additional embodiments of the present invention.

EXAMPLE 1

Pt:Ag Molar Ratio=1:3

Add 2 g alumina (BET surface area=150 m2/g) into 59 ml DDI H2O and stir for 2 hours at room temperature. Add 3.075×10−5 mol $AgNO_3$ (0.616 ml×0.05 M) into the solution at room temperature and stir the solution at same temperature for 1.5 hours. Add 3.075×10−5 mol NH2OH (0.75 ml 4.1×10−2 M NH2OH) into the solution and stir at room temperature for 1 hour. Add 0.2 ml 10 mg/ml Pt(NO3)2 (1.025×10−5 mol Pt) and stir for 2.0 hours. Add 2.05×10$^{-5}$ mol $NH_2OH$ (0.5 ml 4.1×10$^{-2}$ M $NH_2OH$) into the solution and stir at room temperature for 1.5 hours. Filter the solution at room temperature to separate out the liquid from the solid and dry the solid at 120° C. for 2 hours.

EXAMPLE 2

Pt:Ag Molar Ratio=1:3

Add 2 g alumina (BET surface area=150 m2/g) into 59 ml DDI H2O and stir for 2 hours at room temperature. Add 3.075×10−5 mol $AgNO_3$ (0.616 ml×0.05 M) into the solution at room temperature and stir the solution at same temperature for 1.5 hours. Add 0.76875×10−5 mol N2H4 (0.1875 ml 4.1×10$^{-2}$ M N2H4) into the solution and stir at room temperature for 1 hour. Add 0.2 ml 10 mg/ml $Pt(NO_3)_2$ (1.025×10−5 mol Pt) and stir for 1.5 hours. Add 0.615×10−5 mol N2H4 (0.5 ml 4.1×10−2 M N2H4) into the solution and stir at room temperature for 1 hour. Separate out the liquid from the solid by pump evacuation and dry the solid at 120° C. for 2 hours.

EXAMPLE 3

Pt:Ag Molar Ratio=1:15

Add 2 g alumina (BET surface area=150 m2/g) into 59 ml DDI H2O and stir for 2 hours at room temperature. Add 1.5375×10−4 mol AgNO3 (3.075 ml×0.05 M) into the solution at room temperature and stir the solution at same temperature for 1.5 hours. Add 1.5375×10−4 mol NH2OH (0.375 ml 4.1×10−2 M NH2OH) into the solution and stir at room temperature for 1 hour. Add 0.2 ml 10 mg/ml Pt(NO3)2 (1.025×10−5 mol Pt) and stir for 1.5 hours. Add 6.15×10−5 mol NH2OH (1.5 ml 4.1×10−2 M NH2OH) into the solution and stir at room temperature for 1 hour. Filter the solution at room temperature to separate out the liquid from the solid and dry the solid at 120° C. for 2 hours.

EXAMPLE 4

Pt:Ag Molar Ratio=1:75

Add 2 g alumina (BET surface area=150 m$^2$/g) into 59 ml DDI $H_2O$ and stir for 2 hours at room temperature. Add 7.6875×10$^{-4}$ mol $AgNO_3$ (1.5375 ml×0.5 M) and 0.2 ml 10 mg/ml $Pt(NO_3)_2$ (1.025×10$^{-5}$ mol Pt) into the solution at room temperature and stir the solution at same temperature for 21.5 hours. Add $2.30625\times10^{-3}$ mol $NH_2OH$ (1.413 ml 5% $NH_2OH$) into the solution and stir at room temperature for 1 hour. Filter the solution at room temperature to separate out the liquid from the solid and dry the solid at 120° C. for 2 hours.

EXAMPLE 5

Pt:Ag Molar Ratio=1:3

Add 2 g alumina (BET surface area=150 m²/g) into 60 ml DDI $H_2O$ and stir for 2 hours at room temperature. Add 0.2 ml 10 mg/ml $Pt(NO_3)_2$ ($1.025\times10^{-5}$ mol Pt) and $3.075\times10^{-5}$ mol $AgNO_3$ (0.615 ml×0.5 M) into the solution at room temperature and stir the solution at same temperature for 1.6 hours. Add $51.25\times10^{-5}$ mol $NH_2OH$ (1.25 ml 0.41 M $NH_2OH$) into the solution and stir at room temperature for 2 hours. Filter the solution at room temperature to separate out the liquid from the solid and dry the solid at 130° C. for 2 hours.

EXAMPLES 6 AND 7

Pt:Ag Molar Ratio=1:3

Add 10 g alumina (BET surface area=150 m²/g) into 59 ml DDI $H_2O$ and stir for 2 hours at room temperature. Add $15.375\times10^{-5}$ mol $AgNO_3$ (3.08 ml×0.05 M) and stir for 1.6 hours. Add $3.84375\times10^{-5}$ mol $N_2H_4$ (0.9375 ml $4.1\times10^{-2}$ $N_2H_4$) into the solution and stir at room temperature for 1 hour. Add 1 ml 10 mg/ml $Pt(NO_3)_2$ ($5.125\times10^{-5}$ mol Pt) into the solution at room temperature and stir the solution at same temperature for 1.0 hour. Add $3.075\times10^{-5}$ mol $N_2H_4$ (0.75 ml $4.1\times10^{-2}$ M $N_2H_4$) into the solution and continuously to stir for 1 hour. Divide the sample into two equal parts.

EXAMPLE 6

Filter the first part at room temperature to separate out the liquid from the solid and dry the solid at 120° C. for 2 hours.

EXAMPLE 7

Separate out the liquid from the solid in the second part using centrifuge at room temperature and dry the solid at 120° C. for 2 hours.

EXAMPLE 8

Pt:Cu Molar Ratio=3:1

Add 2 g alumina (BET surface area=150 m²/g) into 60 ml DDI $H_2O$ and stir for 2 hours at room temperature. Add $1.025\times10^{-5}$ mol $Cu(NO_3)_2$ (0.205 ml×0.05 M) into the solution at room temperature and stir the solution at same temperature for 1.5 hours. Add $2.05\times10^{-5}$ mol $NH_2OH$ (0.5 ml $4.1\times10^{-2}$ M $NH_2OH$) into the solution and stir at room temperature for 3.0 hours. Add 0.6 ml 10 mg/ml $Pt(NO_3)_2$ ($3.075\times10^{-5}$ mol Pt) and stir for 1.6 hours. Add $7.38\times10^{-5}$ mol $NH_2OH$ (1.8 ml $4.1\times10^{-2}$ M $NH_2OH$) into the solution and stir at room temperature for 1 hour. Filter the solution at room temperature to separate out the liquid from the solid and dry the solid at 120° C. for 2 hours.

EXAMPLE 9

Pt:Cu Molar Ratio=1:3

Add 2 g alumina (BET surface area=150 m²/g) into 60 ml DDI $H_2O$ and stir for 2 hours at room temperature. Add $3.075\times10^{-5}$ mol $Cu(NO_3)_2$ (0.616 ml×0.05 M) and 0.2 ml 10 mg/ml $Pt(NO_3)_2$ ($1.025\times10^{-5}$ mol Pt) into the solution at room temperature and stir the solution at same temperature for 1.5 hours. Purge the solution with Ar at 40 ml/min for 20 minutes and flow $H_2$ at 90 ml/min into the solution for 10 minutes. Seal the solution and remain at room temperature for 48.6 hours while stirring. Filter the solution at room temperature to separate out the liquid from the solid and dry the solid at 120° C. for 2 hours.

EXAMPLE 10

Pt:Cu Molar Ratio=1:3

Add 2 g alumina (BET surface area=150 m²/g) into 60 ml DDI $H_2O$ and stir for 2 hours at room temperature. Add $3.075\times10^{-5}$ mol $Cu(NO_3)_2$ (0.616 ml×0.05 M) into the solution at room temperature and stir the solution at same temperature for 1.6 hours. Add $1.5375\times10^{-5}$ mol $N_2H_4$ (0.375 ml $4.1\times10^{-2}$ M $N_2H_4$) and stir for 3 hours. Add 0.2 ml 10 mg/ml $Pt(NO_3)_2$ ($1.025\times10^{-5}$ mol Pt) into the solution and stir for 1.6 hours. Add $0.615\times10^{-5}$ mol $N_2H_4$ (0.15 ml $4.1\times10^{-2}$ M $N_2H_4$) and continue to stir for 1 hour. Purge the solution with Ar at 40 ml/min for 20 minutes and flow $H_2$ at 90 ml/min into the solution for 10 minutes. Seal the solution and remain at room temperature for 48.6 hours while stirring. Filter the solution at room temperature to separate out the liquid from the solid and dry the solid at 120° C. for 2 hours.

EXAMPLE 11

Pt:Cu Molar Ratio=1:3

Add 2 g alumina (BET surface area=150 m²/g) into 60 ml DDI $H_2O$ and stir for 2 hours at room temperature. Add $3.075\times10^{-5}$ mol $Cu(NO_3)_2$ (0.616 ml×0.05 M) into the solution at room temperature and stir the solution at same temperature for 1.6 hours. Add $6.15\times10^{-5}$ mol $NH_2OH$ (1.5 ml $4.1\times10^{-2}$ M $NH_2OH$) and stir 3.0 hours. Add 0.2 ml 10 mg/ml $Pt(NO_3)_2$ ($1.025\times10^{-5}$ mol Pt) into the solution and stir for 1.6 hours. Add $2.46\times10^{-5}$ mol $NH_2OH$ (0.15 ml $4.1\times10^{-2}$ M $NH_2OH$) and continue to stir for 1 hour. Filter the solution at room temperature to separate out the liquid from the solid and dry the solid at 120° C. for 2 hours.

EXAMPLE 12

Pt:Cu Molar Ratio=1:3

Add 2 g alumina (BET surface area=150 m²/g) into 60 ml DDI $H_2O$ and stir for 2 hours at room temperature. Add $15.375\times10^{-5}$ mol $Cu(NO_3)_2$ (3.08 ml×0.05 M) into the solution at room temperature and stir the solution at same temperature for 1.6 hours. Add $30.75\times10^{-5}$ mol $NH_2OH$ (7.5 ml $4.1\times10^{-2}$ M $NH_2OH$) and stir 3.0 hours. Add 0.2 ml 10 mg/ml $Pt(NO_3)_2$ ($1.025\times10^{-5}$ mol Pt) into the solution and stir for 1.6 hours. Add $2.46\times10^{-5}$ mol $NH_2OH$ (0.6 ml $4.1\times10^{-2}$ M $NH_2OH$) and continue to stir for 1 hour. Filter the solution at room temperature to separate out the liquid from the solid and dry the solid at 120° C. for 2 hours.

EXAMPLE 13

Pt:Cu Molar Ratio=1:3

Add 2 g alumina (BET surface area=150 m$^2$/g) into 60 ml DDI H$_2$O and stir for 2 hours at room temperature. Add $3.075 \times 10^{-5}$ mol Cu(NO$_3$)$_2$ (0.616 ml×0.05 M) into the solution at room temperature and stir the solution and increase temperature to 88° C. and continuously stir for 1.6 hours. Add $6.015 \times 10^{-5}$ mol NH$_2$OH (1.5 ml $4.1 \times 10^{-2}$ M NH$_2$OH) and stir for 1.75 hours. Cool down the solution to room temperature. Add 0.2 ml 10 mg/ml Pt(NO$_3$)$_2$ ($1.025 \times 10^{-5}$ mol Pt) into the solution and stir for 1.6 hours at room temperature. Add $2.46 \times 10^{-5}$ mol NH$_2$OH (0.6 ml $4.1 \times 10^{-2}$ M NH$_2$OH) and continue to stir for 1 hour. Filter the solution at room temperature to separate out the liquid from the solid and dry the solid at 120° C. for 2 hours.

EXAMPLE 14

Pt:Cu Molar Ratio=1:15

Add 2 g alumina (BET surface area=150 m$^2$/g) into 60 ml DDI H$_2$O and stir for 2 hours at room temperature. Add $15.375 \times 10^{-5}$ mol Cu(NO$_3$)$_2$ (3.08 ml×0.05 M) into the solution at room temperature and stir the solution and increase temperature to 88° C. and continuously stir for 1.25 hours. Add $30.75 \times 10^{-5}$ mol NH$_2$OH (7.5 ml $4.1 \times 10^{-2}$ M NH$_2$OH) and stir for 1.75 hours. Cool down the solution to room temperature. Add 0.2 ml 10 mg/ml Pt(NO$_3$)$_2$ ($1.025 \times 10^{-5}$ mol Pt) into the solution and stir for 1.6 hours at room temperature. Add $2.46 \times 10^{-5}$ mol NH$_2$OH (0.6 ml $4.1 \times 10^{-2}$ M NH$_2$OH) and continue to stir for 1 hour. Filter the solution at room temperature to separate out the liquid from the solid and dry the solid at 120° C. for 2 hours.

EXAMPLE 15

Pt:Cu Molar Ratio=1:15

Add 2 g alumina (BET surface area=150 m$^2$/g) into 60 ml DDI H$_2$O and stir for 2 hours at room temperature. Add $15.375 \times 10^{-5}$ mol Cu(NO$_3$)$_2$ (3.08 ml×0.05 M) into the solution at room temperature and stir the solution continuously for 1.6 hours. Add $30.75 \times 10^{-5}$ mol NH$_2$OH (7.5 ml $4.1 \times 10^{-2}$ M NH$_2$OH) and stir for 3.0 hours at room temperature. Add 0.2 ml 10 mg/ml Pt(NO$_3$)$_2$ ($1.025 \times 10^{-5}$ mol Pt) into the solution and stir for 1.6 hours at room temperature. Add $2.46 \times 10^{-5}$ mol NH$_2$OH (0.6 ml $4.1 \times 10^{-2}$ M NH$_2$OH) and continue to stir for 1 hour. Filter the solution at room temperature to separate out the liquid from the solid and dry the solid at 120° C. for 2 hours.

EXAMPLE 16

Pt:Cu Molar Ratio=1:75

Add 2 g alumina (BET surface area=150 m$^2$/g) into 60 ml DDI H$_2$O and stir for 2 hours at room temperature. Add $76.875 \times 10^{-5}$ mol Cu(NO$_3$)$_2$ (1.5375 ml×0.05 M) into the solution at room temperature and stir the solution continuously stir for 1.6 hours. Add $153.75 \times 10^{-5}$ mol NH$_2$OH (3.75 ml $4.1 \times 10^{-1}$ M NH$_2$OH) and stir for 1.0 hour. Add 0.2 ml 10 mg/ml Pt(NO$_3$)$_2$ ($1.025 \times 10^{-5}$ mol Pt) into the solution and stir for 1.5 hours at room temperature. Add $6.15 \times 10^{-5}$ mol NH$_2$OH (1.5 ml $4.1 \times 10^{-2}$ M NH$_2$OH) and continue to stir for 1 hour. Filter the solution at room temperature to separate out the liquid from the solid and dry the solid at 120° C. for 2 hours.

EXAMPLE 17

Pt:Cu Molar Ratio=1:75

Add 2 g alumina (BET surface area=150 m$^2$/g) into 60 ml DDI H$_2$O and stir for 2 hours at room temperature. Add $76.875 \times 10^{-5}$ mol Cu(NO$_3$)$_2$ (1.5375 ml×0.5 M) into the solution at room temperature and stir the solution continuously stir for 1.6 hours. Purge the solution with Ar at 40 ml/min for 20 minutes. Add $153.75 \times 10^{-5}$ mol NH$_2$OH (3.75 ml $4.1 \times 10^{-1}$ M NH$_2$OH) and stir for 1.0 hour under Ar atmosphere. Add 0.2 ml 10 mg/ml Pt(NO$_3$)$_2$ ($1.025 \times 10^{-5}$ mol Pt) into the solution and stir for 1.5 hours at room temperature under Ar atmosphere. Add $6.15 \times 10^{-5}$ mol NH$_2$OH (1.5 ml $4.1 \times 10^{-2}$ M NH$_2$OH) and continue to stir for 1 hour under Ar atmosphere. Filter the solution at room temperature to separate out the liquid from the solid and dry the solid at 120° C. for 2 hours.

EXAMPLE 18

Pt:Cu Molar Ratio=1:75

Add 2 g alumina (BET surface area=150 m$^2$/g) into 60 ml DDI H$_2$O and stir for 2 hours at room temperature. Add 0.2 ml 10 mg/ml Pt(NO$_3$)$_2$ ($1.025 \times 10^{-5}$ mol Pt) into the solution at room temperature. Add $76.875 \times 10^{-5}$ mol Cu(NO$_3$)$_2$ (1.5375 ml×0.5 M) into the solution while stirring. Continuously stir the solution for 5.6 hours. Purge the solution with Ar at 40 ml/min for 20 minutes. Add $461.25 \times 10^{-5}$ mol NH$_2$OH (0.2827 ml 50% M NH$_2$OH) and stir for 10 minutes under Ar atmosphere. Filter the solution at room temperature to separate out the liquid from the solid and dry the solid at 120° C. for 2 hours.

EXAMPLE 19

Pt:Cu Molar Ratio=1:75

Add 2 g alumina (BET surface area=150 m$^2$/g) into 60 ml DDI H$_2$O and stir for 2 hours at room temperature. Add 0.2 ml 10 mg/ml Pt(NO$_3$)$_2$ ($1.025 \times 10^{-5}$ mol Pt) into the solution at room temperature. Continuously stir the solution for 1.5 hours. Add $1.025 \times 10^{-5}$ mol NH$_2$OH (0.25 ml $4.1 \times 10^{-2}$ M NH$_2$OH) and stir for 1 hour. Add $76.875 \times 10^{-5}$ mol Cu(NO$_3$)$_2$ (1.5375 ml×0.5 M) into the solution and stir for 2.75 hours. Purge the solution with Ar at 40 ml/min for 20 minutes. Add $461.25 \times 10^{-5}$ mol NH$_2$OH (0.2827 ml 50% NH$_2$OH) into the solution and stir for 10 minutes under Ar atmosphere. Filter the solution at room temperature to separate out the liquid from the solid and dry the solid at 120° C. for 2 hours.

EXAMPLE 20

Pt:Cu Molar Ratio=1:200

Add 2 g alumina (BET surface area=150 m$^2$/g) into 60 ml DDI H$_2$O and stir for 2 hours at room temperature. Add 0.2 ml 10 mg/ml Pt(NO$_3$)$_2$ ($1.025 \times 10^{-5}$ mol Pt) into the solution at room temperature. Add $205 \times 10^{-5}$ mol Cu(NO$_3$)$_2$ (4.1 ml×0.5 M) into the solution. Continuously stir the solution for 2.8 hours. Add $1230 \times 10^{-5}$ mol NH$_2$OH (0.7538 ml 50%

$NH_2OH$) and stir for 8 hours. Filter the solution at room temperature to separate out the liquid from the solid and dry the solid at 120° C. for 2 hours.

EXAMPLE 21

Ag:Cu Molar Ratio=15:75

Add 2 g alumina (BET surface area=150 m$^2$/g) into 60 ml DDI $H_2O$ and stir for 2 hours at room temperature. Add $15.375 \times 10^{-5}$ mol $AgNO_3$ (0.3075 ml×0.5 M), into the solution at room temperature. Add $76.875 \times 10^{-5}$ mol $Cu(NO_3)_2$ (1.5375 ml×0.5 M) into the solution. Continuously stir the solution for 3.5 hours. Add $507.375 \times 10^{-5}$ mol $NH_2OH$ (3.109 ml 5% $NH_2OH$) and stir for 3.8 hours. Filter the solution at room temperature to separate out the liquid from the solid and dry the solid at 120° C. for 2 hours.

EXAMPLE 22

Pt:Ag:Cu Molar Ratio=1:15:75

Add 2 g alumina (BET surface area=150 m$^2$/g) into 60 ml DDI $H_2O$ and stir for 2 hours at room temperature. Add $15.375 \times 10^{-5}$ mol $AgNO_3$ (0.3075 ml×0.5 M), into the solution at room temperature. Add $76.875 \times 10^{-5}$ mol $Cu(NO_3)_2$ (1.5375 ml×0.5 M) into the solution and $1.025 \times 10^{-5}$ mol $Pt(NO_3)_2$ (0.2 ml×10 mg/ml). Continuously stir the solution at room temperature for 2.25 hours. Add $507.375 \times 10^{-5}$ mol $NH_2OH$ (3.109 ml 5% $NH_2OH$) and stir for 4.0 hours. Filter the solution at room temperature to separate out the liquid from the solid and dry the solid at 120° C. for 2 hours.

EXAMPLE 23

Pt:Pd Molar Ratio=2:1

Add 2 g alumina (BET surface area=150 m$^2$/g) into 60 ml DDI $H_2O$ and stir for 2 hours at room temperature. Add $2.733 \times 10^{-5}$ mol $Pt(NO_3)_2$ (0.533 ml×10 mg/ml) and $1.367 \times 10^{-5}$ mol $Pd(NH_3)_4(NO_3)_2$ (0.267 ml, 1.455 mg Pd) into the solution at room temperature and stir the solution continuously at room temperature for 1.5 hours. Add $136.66 \times 10^{-5}$ mol $NH_2OH$ (3.33 ml 0.41 M $NH_2OH$) and stir for 2.0 hours. Filter the solution at room temperature to separate out the liquid from the solid and dry the solid at 130° C. for 2.5 hours.

EXAMPLE 24

Pd:Ag Molar Ratio=1:3

Add 2 g alumina (BET surface area=150 m$^2$/g) into 60 ml DDI $H_2O$ and stir for 2 hours at room temperature. Add $1.025 \times 10^{-5}$ mol $Pd(NH_3)_4(NO_3)_2$ (0.2 ml) and $3.075 \times 10^{-5}$ mol $AgNO_3$ (0.615 ml 0.05 M) into the solution at room temperature and stir the solution continuously at room temperature for 2.0 hours. Add $51.25 \times 10^{-5}$ mol $NH_2OH$ (1.25 ml 0.41 $NH_2OH$) and stir for 2.0 hours. Filter the solution at room temperature to separate out the liquid from the solid and dry the solid at 130° C. for 2.0 hours.

EXAMPLE 25

Pd:Ag Molar Ratio=4:12

Add 2 g alumina (BET surface area=150 m$^2$/g) into 60 ml DDI $H_2O$ and stir for 2 hours at room temperature. Add $4.1 \times 10^{-5}$ mol $Pd(NH_3)_4(NO_3)_2$ (0.8 ml) and $12.3 \times 10^{-5}$ mol $AgNO_3$ (2.46 ml 0.05 M) into the solution at room temperature and stir the solution continuously at room temperature for 2.4 hours. Add $205 \times 10^{-5}$ mol $NH_2OH$ (1.256 ml 5% $NH_2OH$) and stir for 2.0 hours. Filter the solution at room temperature to separate out the liquid from the solid and dry the solid at 130° C. for 2.0 hours.

EXAMPLE 26

Pd:Ag Molar Ratio=4:12

Add 2 g alumina (BET surface area=150 m$^2$/g) into 60 ml DDI $H_2O$ and stir for 2 hours at room temperature. Add $4.1 \times 10^{-5}$ mol $Pd(NO_3)_2$ (0.8 ml) and $12.3 \times 10^{-5}$ mol $AgNO_3$ (2.46 ml 0.05 M) into the solution at room temperature and stir the solution continuously at room temperature for 2.4 hours. Add $205 \times 10^{-5}$ mol $NH_2OH$ (1.256 ml 5% $NH_2OH$) and stir for 2.0 hours. Filter the solution at room temperature to separate out the liquid from the solid and dry the solid at 130° C. for 2.0 hours. The particle sizes and distributions were determined by transmission electron microscopy (TEM) or scanning transmission electron microscopy (STEM) in some of the above examples. Prior to the measurements, the metal particles were separated from the support by dissolving the alumina support in 10-50% HF, by methods well known in the art. Dimension measurements made by TEM or STEM are subject to an estimated error of 10%. The results are noted below.

| Example | Diameter (in nanometers) from TEM results | | | Diameter (in nanometers) from STEM results | | |
|---|---|---|---|---|---|---|
| | D range | D avg | Std dev. | D range | D avg | Std dev. |
| 2 | 5-15 | 8.9 | 2.5 | | | |
| 5 | | | | 2-10 | 5.3 | 1.3 |
| 25 | 2-15 | 4.6 | 2.1 | | | |

The catalytic performance of the catalysts manufactured in accordance with examples 1-26 is shown in the following table in terms of their T50 for CO oxidation. The T50 was determined in the following manner. Prior to the measurement of CO oxidation activity, the catalysts were subjected to a standardized calcining process. The standardized calcining process included: (1) loading the catalyst into a reactor; (2) heating the catalyst in 1% oxygen (remainder inert gas) at a rate of 3° C./minute from room temperature to about 500° C.; (3) purging the reactor for 10 minutes with pure He at 500° C. to remove oxygen; (4) introducing 5% hydrogen (remainder inert gas) into the reactor for 1 hour at 500° C.; and (5) purging the reactor in pure He while cooling down the reactor to room temperature. Without removing the catalyst from the reactor, the CO oxidation was then carried out. The CO oxidation process included: (1) purging the reactor with the reaction mixture of 1.4% CO, 5.6% $O_2$ (balance He) at room temperature; and (2) heating the reactor from room temperature to 200° C. at about 2° C./minute with the aforementioned $CO/O_2$ mixture. During this heating step, $CO_2$ yield was measured as a function of the temperature. The temperature at 50% $CO_2$ yield is noted in the examples below. It has been observed that the T50 for each of the catalyst examples 1-26 is less than the T50 for a prior art Pt catalyst.

It has also been observed that the Pt loading requirement for the example catalysts that contain Pt is significantly less than the Pt loading requirement for the prior art Pt catalyst. As a result, the overall metal cost of the catalysts of examples 1-26 is significantly less than the metal cost of the prior art Pt catalyst. For those example catalysts that employ Ag and Cu in place of Pt, the metal cost of those catalysts are negligible relative to the metal cost of the prior art Pt catalyst.

The overall metal cost of the catalyst is further reduced because the T50 for CO oxidation for catalysts of examples 1-26 is less than the T50 for CO oxidation for the prior art Pt catalyst. The reason is that, when compared to each of the catalysts of examples 1-26, the prior art Pt catalyst requires additional Pt to achieve the same performance. To obtain the total metal cost reduction figure for each of the examples 1-26, the CO yield (e.g., X %) of the prior art Pt catalyst was determined from the light-off curve of the prior art Pt catalyst (FIG. 1) at the T50 of the example catalyst being compared with, and the following calculations were carried out:

Perform data fitting of the Pt loading data vs. T50 in the light off curve test of the prior art catalyst to get a function between Pt loading and T50. Apply this function for different T-50s to get the corresponding Pt loading required wt %.

Pt reduction=1−(example Pt required wt %)/(Pt loading required wt %), where the Pd, Ag and Cu requirements have been normalized as Pt requirements based on the cost of Pd (25%), Ag (0%) and Cu (0%) relative to Pt. Therefore, an X1 gram requirement of Pd is normalized as X1*0.25 gram requirement of Pt; an X2 gram requirement of Ag is normalized as a 0 gram requirement of Pt; and an X3 gram requirement of Cu is normalized as a 0 gram requirement of Pt.

| Catalyst | Pt Loading (wt %) | Other Metal(s) (wt %) | T50 (° C.) | Metal cost reduction* (%) |
|---|---|---|---|---|
| Prior Art | 0.4 | None | 167 | 0 |
| 1 | 0.1 | Ag 0.166 | 109 | 96 |
| 2 | 0.1 | Ag 0.166 | 107 | 97 |
| 3 | 0.1 | Ag 0.829 | 82.8 | 98 |
| 4 | 0.2 | Ag 4.15 | 63 | 98 |
| 5 | 0.1 | Ag 0.166 | 113 | 96 |
| 6 | 0.1 | Ag 0.166 | 113.5 | 96 |
| 7 | 0.1 | Ag 0.166 | 116 | 96 |
| 8 | 0.3 | Cu 0.033 | 150 | 66 |
| 9 | 0.1 | Cu 0.0983 | 167 | 80 |
| 10 | 0.1 | Cu 0.098 | 162 | 83 |
| 11 | 0.1 | Cu 0.098 | 161 | 84 |
| 12 | 0.1 | Cu 2.44 | 113 | 96 |
| 13 | 0.1 | Cu 0.098 | 174 | 77 |
| 14 | 0.1 | Cu 0.49 | 123 | 95 |
| 15 | 0.1 | Cu 0.49 | 101 | 97 |
| 16 | 0.1 | Cu 2.44 | 100 | 97 |
| 17 | 0.1 | Cu 2.44 | 117 | 96 |
| 18 | 0.1 | Cu 2.44 | 110 | 96 |
| 19 | 0.1 | Cu 2.44 | 124 | 95 |
| 20 | 0.1 | Cu 6.51 | 94 | 98 |
| 21 | None | Ag 0.83; Cu 2.44 | 97 | 100 |
| 22 | 0.1 | Ag 0.83; Cu 2.44 | 86 | 98 |
| 23 | 0.27 | Pd 0.073 | 111 | 89 |
| 24 | None | Pd 0.055; Ag 0.17 | 102 | 99 |
| 25 | None | Pd 0.22; Ag 0.64 | 98 | 99 |
| 26 | None | Pd 0.22; Ag 0.64 | 78 | 100 |

While particular embodiments according to the invention have been illustrated and described above, those skilled in the art understand that the invention can take a variety of forms and embodiments within the scope of the appended claims.

What is claimed is:

1. A method of producing a supported platinum-palladium catalyst, comprising the steps of:
    contacting a quantity of alumina support material with a volume of water for a first time period to form a liquid mixture, wherein said volume of water is greater than two times a pore volume of said quantity of alumina support material;
    adding a platinum salt solution having a molar concentration of 0.0001 to 0.1 and a palladium salt solution having a molar concentration of 0.0001 to 0.1 to said liquid mixture following said first time period and stirring said liquid mixture for a second time period;
    adding a reducing agent to said liquid mixture following said second time period and stirring said liquid mixture for a third time period;
    separating out said quantity of alumina support material with platinum particles and palladium particles supported thereon from the liquid mixture; and
    drying said quantity of alumina support material with platinum particles and palladium particles supported thereon,
    wherein said platinum salt is reduced to platinum particles within said liquid mixture during said third time period, and said palladium salt is reduced to palladium particles within pores of said quantity of alumina support material within said liquid mixture during said third time period.

2. The method according to claim 1, wherein said platinum salt solution added to said liquid mixture comprises dissolved platinum ions and said palladium salt solution added to said liquid mixture comprises dissolved palladium ions.

3. The method according to claim 2, wherein pH of said liquid mixture is not adjusted after the platinum salt solution and the palladium salt solution are added to said liquid mixture.

4. The method according to claim 3, wherein said reducing agent is chosen from the group consisting of $N_2H_4$, $NH_2OH$, sodium citrate, potassium citrate, ammonium citrate, alkali metal borohydrides, alcohols and glycols.

5. The method according to claim 4, wherein the reducing agent comprises $NH_2OH$.

6. The method according to claim 4, wherein said platinum salt solution comprises $Pt(NO_3)_2$ and the palladium salt solution comprises $Pd(NH_3)_4(NO_3)_2$.

7. The method according to claim 4, wherein the combined metal weight loading of the platinum and palladium metal particles is less than 1%.

8. The method according to claim 1, wherein the platinum to palladium weight loading ratio is between 3:1 to 4:1.

9. A method of producing a supported mixed metal catalyst, comprising the steps of:
    contacting a quantity of support material with a volume of solvent for a first time period to form a liquid mixture, wherein said volume of solvent is greater than two times a pore volume of said quantity of support material;
    adding a metal salt solution of a first type having a molar concentration of 0.0001 to 0.1 to said liquid mixture following said first time period and stirring said liquid mixture for a second time period;
    adding a first reducing agent to said liquid mixture following said second time period and stirring said liquid mixture for a third time period, wherein said metal salt of the first type is reduced to metal particles within pores of said quantity of support material within said liquid mixture during said third time period;

adding a metal salt solution of a second type having a molar concentration of 0.0001 to 0.1 to said liquid mixture following said third time period and stirring said liquid mixture for a fourth time period; and adding a second reducing agent to said liquid mixture following said fourth time period and stirring said liquid mixture for a fifth time period, wherein said metal salt of the second type is reduced to metal particles within pores of said quantity of support material within said liquid mixture during said fifth time period.

10. The method according to claim 9, wherein said metal salt solution of the first type added to said liquid mixture comprises dissolved metal ions of the first type and said metal salt solution of the second type added to said liquid mixture comprises dissolved metal ions of the second type.

11. The method according to claim 10, wherein pH of said liquid mixture is not adjusted from start of the first time period until end of the fifth time period.

12. The method according to claim 11, wherein one of the two types of metals is platinum.

13. The method according to claim 12, wherein both of said first and second reducing agents are chosen from the group consisting of $N_2H_4$, $NH_2OH$, sodium citrate, potassium citrate, ammonium citrate, alkali metal borohydrides, alcohols and glycols.

14. The method according to claim 13, wherein both of said first and second reducing agents comprise $NH_2OH$.

15. The method according to claim 14, wherein the first reducing agent is different from the second reducing agent.

16. The method according to claim 13, wherein the platinum salt comprises $Pt(NO_3)_2$.

17. The method according to claim 12, wherein the weight loading of the platinum particles is less than 1%.

18. The method according to claim 12, wherein one of the two types of metals is silver or copper.

19. The method according to claim 9, wherein the support material comprises alumina and the solvent is water.

* * * * *